United States Patent
Nakashima

(10) Patent No.: US 9,559,785 B2
(45) Date of Patent: Jan. 31, 2017

(54) FREQUENCY ERROR ESTIMATING APPARATUS AND METHOD, FREQUENCY ERROR COMPENSATING APPARATUS, AND OPTICAL RECEIVER

(71) Applicant: FUJITSU LIMITED, Kawasaki-shi, Kanagawa (JP)

(72) Inventor: Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/168,456

(22) Filed: Jan. 30, 2014

(65) Prior Publication Data

US 2014/0270810 A1  Sep. 18, 2014

(30) Foreign Application Priority Data

Mar. 12, 2013  (JP) .................................. 2013-049017

(51) Int. Cl.
*H04B 10/61* (2013.01)
*H04B 10/66* (2013.01)

(52) U.S. Cl.
CPC .......... *H04B 10/66* (2013.01); *H04B 10/6164* (2013.01); *H04B 10/6165* (2013.01)

(58) Field of Classification Search
CPC . H04B 10/612; H04B 10/613; H04B 10/6164; H04B 10/6165; H04B 10/66
See application file for complete search history.

(56) References Cited

U.S. PATENT DOCUMENTS

| | | | |
|---|---|---|---|
| 8,078,066 B2 | 12/2011 | Li et al. | |
| 8,103,176 B2 | 1/2012 | Li et al. | |
| 2009/0129787 A1 | 5/2009 | Li et al. | |
| 2009/0142076 A1 | 6/2009 | Li et al. | |
| 2010/0002810 A1 | 1/2010 | Li et al. | |
| 2010/0329677 A1* | 12/2010 | Kaneda et al. | 398/65 |
| 2012/0155890 A1 | 6/2012 | Zhou et al. | |
| 2013/0243422 A1* | 9/2013 | Hauske | 398/25 |

(Continued)

FOREIGN PATENT DOCUMENTS

| | | |
|---|---|---|
| CN | 101442364 A | 5/2009 |
| EP | 1986352 A2 | 10/2008 |

(Continued)

OTHER PUBLICATIONS

Extended European Search Report dated Jul. 3, 2014 in corresponding European Patent Application No. 14154814.9.

(Continued)

*Primary Examiner* — Leslie Pascal
(74) *Attorney, Agent, or Firm* — Staas & Halsey LLP

(57) ABSTRACT

Provided is a frequency error estimating apparatus used for a coherent optical receiver, which determines an amplitude of a baseband digital electrical signal converted from a received light signal modulated with a phase and amplitude shift keying, determines, with respect to each determined amplitude, a modulated phase component of the baseband digital electrical signal based on phase noise estimation values and frequency error estimation values of N previous symbols (N is a positive integer), and calculates a frequency error based on an inter-symbol phase difference of a signal obtained by cancelling the modulated phase component from the baseband digital electrical signal.

7 Claims, 13 Drawing Sheets

(56) References Cited

U.S. PATENT DOCUMENTS

2014/0010532 A1* 1/2014 Zhang et al. .................. 398/25

FOREIGN PATENT DOCUMENTS

| EP | 2071747 A1 | 6/2009 |
|----|------------|--------|
| JP | 2002-217995 | 8/2002 |
| JP | 2009-130935 | 6/2009 |
| JP | 2009-135930 | 6/2009 |

OTHER PUBLICATIONS

Andreas Leven et al., "Frequency Estimation in Intradyne Reception", IEEE Photonics Technology Letters, vol. 19, No. 6, Mar. 2007.

Japanese Office Action dated Jun. 14, 2016 in corresponding Japanese Patent Application No. 2013-049017.

Chinese Office Action mailed Sep. 27, 2016 in related Chinese Application No. 201410088222.3.

* cited by examiner

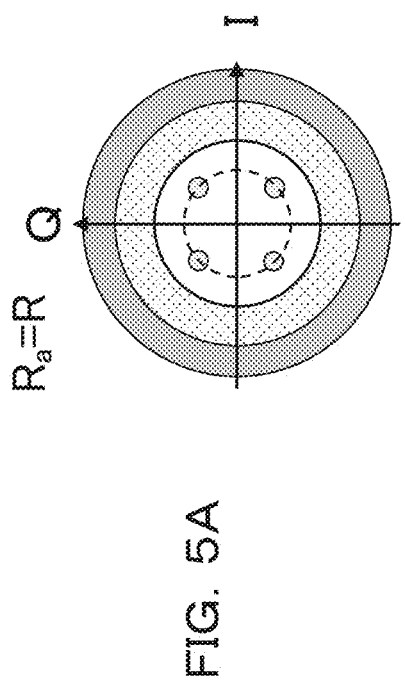

| min | max | θ |
|---|---|---|
| 0 | π/4 | atan(1/3) |
| π/4 | π/2 | atan(3/1) |
| π/2 | 3π/4 | atan(1/3)+π/2 |
| 3π/4 | π | atan(3/1)+π/2 |
| π | 5π/4 | atan(1/3)+π |
| 5π/4 | 3π/2 | atan(3/1)+π |
| 3π/2 | 7π/4 | atan(1/3)+3π/2 |
| 7π/4 | 2π | atan(3/1)+3π/2 |

# FREQUENCY ERROR ESTIMATING APPARATUS AND METHOD, FREQUENCY ERROR COMPENSATING APPARATUS, AND OPTICAL RECEIVER

CROSS-REFERENCE TO RELATED APPLICATION

This application is based upon and claims the benefit of priority of the prior Japanese Patent Application No. 2013-049017, filed on Mar. 12, 2013, the entire contents of which are incorporated herein by reference.

FIELD

An embodiment is directed to a frequency error estimating apparatus and method, a frequency error compensating apparatus, and an optical receiver.

BACKGROUND

A digital coherent reception technique has been interested as a technique of implementing large-capacity optical communication with long-distance transmission. In the digital coherent reception technique, intensity information and phase information of a received signal are extracted using a coherent front-end circuit according to a coherent optical reception scheme using a local oscillation light. Then, compensation for waveform distortion occurred in a transmission path is performed on the received signal by using digital signal processing based on the extracted intensity information and the extracted phase information, and then the received signal is demodulated.

In the case where coherent optical reception is employed, an apparatus that cancels a frequency error (frequency offset) between the received signal and the local oscillation light is important.

(Frequency Offset Compensation)

As a method of cancelling a frequency offset between a received signal and local oscillation light, a technique proposed in, for example, JP 2009-135930 A has been known. This technique performs: detecting a frequency offset from a received digital signal; and compensating the frequency offset by applying an opposite phase rotation corresponding to the detected frequency offset to the received signal.

(Frequency Offset Estimation)

Meanwhile, as a frequency offset estimation method, techniques proposed in Andreas Leven et al., *Frequency Estimation in Intradyne Reception*, IEEE Photonics Technology Letters, Vol. 19, No. 6, Mar. 15, 2007, pp. 366-368 and JP 2009-130935 A have been known.

(N-th Power Method)

In the estimation technique disclosed in Andreas Leven et al., a phase rotation amount per delay amount is calculated while cancelling a phase noise by performing delay, conjugation and multiplication on a baseband electrical signal (complex signal) of an input N phase PSK signal, and a phase rotation amount per delay amount due to a frequency offset is obtained by raising an obtained signal to the power of N and cancelling a data phase (modulated phase component). Here, N represents a multi-valued degree, and N is 4 in the QPSK. In the QPSK, a possible value of a data phase is any one of 0, $\pm\pi/2$, $\pm\pi$, and $\pm 3\pi/4$.

Here, the data phase is cancelled by the above N-th (=4)-power, however, the frequency offset quadruples. After influence of noise is cancelled by averaging, the frequency offset is subjected to a ¼ argument operation by a ¼ argument calculation, and so a frequency offset estimation value is obtained.

(PADE Technique)

Meanwhile, in the estimation technique discussed in JP 2009-130935 A, unlike the N-th power method described above, a conjugate calculation and an N-th power of a complex signal are not used, and an estimatable range of a frequency offset is increased to be larger than in the N-th power method. This estimation technique is also called a pre-decision based angle differential frequency offset estimator (PADE).

In the PADE technique, in order to remove a symbol phase term ($n\pi/4$ (n=1, 2, 3, 4) in the case of the QPSK), a provisional determination of a symbol phase value is performed by using a laser phase noise estimation amount and a frequency offset estimation value preceded by a one-symbol time to remove the symbol phase term.

The N-th power method is a technique supporting only the PSK. Meanwhile, the PADE technique can support all modulation schemes by using a provisional determiner as an identification circuit supporting the respective modulation schemes.

However, when the frequency offset estimation value is significantly different from an actual frequency offset, it is difficult to set an appropriate frequency error to the provisional determiner, and an error occurs in the provisional determination. For example, as illustrated in FIG. 13, when there is a frequency estimation error, in a determination threshold value of the 16QAM, it is erroneously determined as an adjacent symbol, and thus a phase error is smaller than a true phase error, or it looks like there is no error.

As a result, in the phase and amplitude shift keying scheme such as the 16QAM, the frequency offset estimation value may be unstable, and thus the value may converge with an erroneous frequency offset estimation value, or the tracking performance to variation in a frequency offset significantly may deteriorate.

SUMMARY

An aspect of a frequency error estimating apparatus is a frequency error estimating apparatus used for a coherent optical receiver, and includes an amplitude determiner configured to determine an amplitude of a baseband electrical signal converted from a received light signal modulated with a phase and amplitude shift keying, an amplitude directed phase determiner configured to determine, with respect to each amplitude determined by the amplitude determiner, a modulated phase component of the baseband digital electrical signal using phase noise estimation values and frequency error estimation values of 1 to N previous symbols, and a frequency error calculator configured to calculate a frequency error based on an inter-symbol phase difference of a signal obtained by cancelling the modulated phase component from the baseband digital electrical signal.

An aspect of a frequency error compensating apparatus includes the frequency error estimating apparatus described above and a frequency error compensator configured to generate a signal used to compensate a frequency error obtained by the frequency error estimating apparatus.

An aspect of an optical receiver includes a front-end processor configured to convert a received light signal modulated with a phase and amplitude shift keying into a baseband digital electrical signal and the above-mentioned frequency error compensating apparatus configured to perform frequency error compensation on the baseband digital electrical signal obtained by the front-end processor.

An aspect of a frequency error estimating method is a frequency error estimating method in a coherent optical receiver, and includes: determining an amplitude of a baseband digital electrical signal converted from a received light signal modulated with a phase and amplitude shift keying; determining, with respect to each determined amplitude, a modulated phase component of the baseband digital electrical signal by using phase noise and frequency offset estimation values of N previous symbols (N is a positive integer); and calculating a frequency error based on an inter-symbol phase difference of a signal obtained by cancelling the modulated phase component from the baseband digital electrical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are diagrams for explaining an amplitude determination (16QAM) by the frequency error estimator illustrated in FIG. 3;

DESCRIPTION OF EMBODIMENTS

Figure 1:
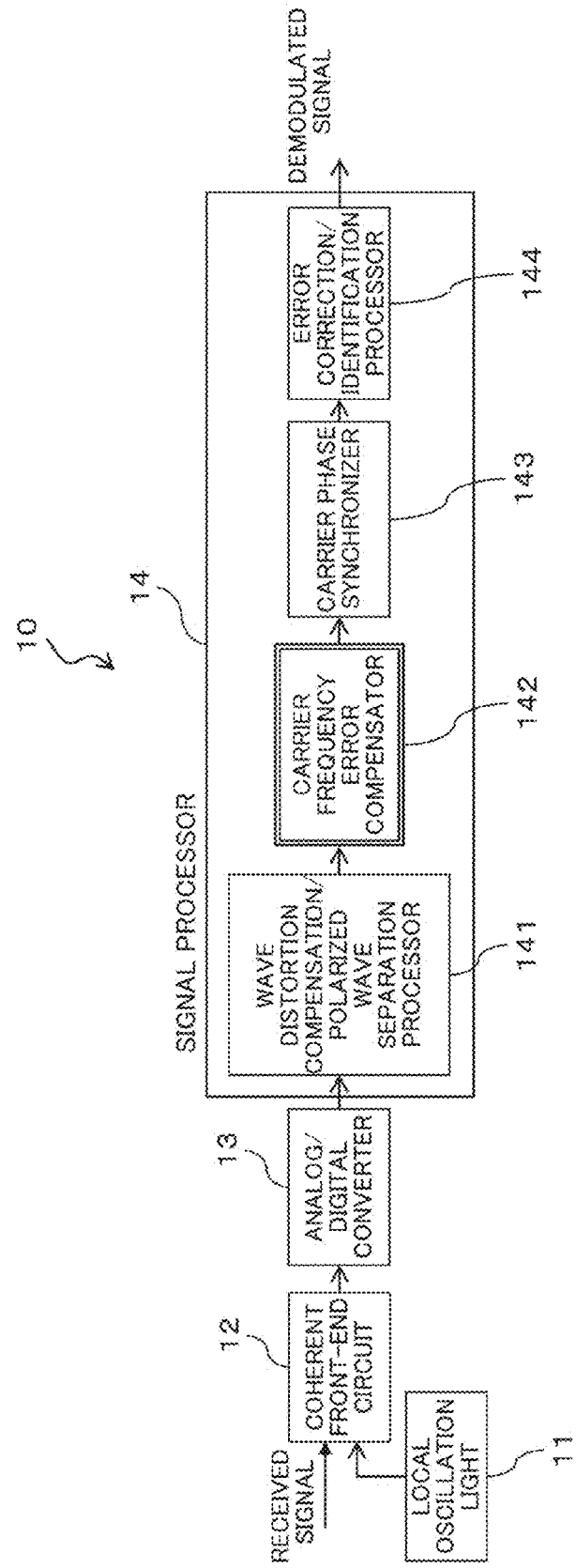
FIG. 1 is a block diagram illustrating an example of a coherent optical receiver to which a frequency error estimating apparatus according to an embodiment is applied.

Hereinafter, an exemplary embodiment of the present invention will be described with reference to the appended drawings. The following description is merely an example and not intended to exclude various modifications or technical applications which will not be described below. In the drawings used in the following embodiment, components denoted by the same reference numerals are the same or similar components unless otherwise set forth herein.

FIG. 1 is a block diagram illustrating an example of a coherent optical receiver to which a frequency error estimating apparatus according to an embodiment is applied.

A coherent optical receiver 10 illustrated in FIG. 1, which is an example of an optical receiver includes a local oscillation light 11, a coherent front-end circuit 12, an analog/digital converter 13, and a signal processor 14, for example. The signal processor 14 includes a waveform distortion compensation/polarization multiplexed signal separation processor 141, a carrier frequency error compensator 142, a carrier phase synchronizer 143, and an error correction/identification processor 144, for example.

The coherent front-end circuit 12 performs coherent reception of received signal light. Specifically, the coherent front-end circuit 12 mixes a signal light inputted from a transmission path, local oscillation light outputted from the local oscillation light 11, and local oscillation light shifted its phase by a 90° relative to the signal light, and extracts two phase components which are orthogonal to each other. Then, the coherent front-end circuit 12 converts the phase components into electrical signals with photoelectric conversion, and outputs an in-phase component I and a quadrature component Q to the analog/digital converter 13.

The analog/digital converter 13 performs sampling on the in-phase component I and the quadrature component Q, and obtains the baseband digital electrical signal (I+jQ). A block configured with the coherent front-end circuit 12 and the analog/digital converter 13 may be considered as a front-end processor.

The signal processor 14 performs signal processing including processes such as (1) waveform distortion compensation and polarization multiplexed signal separation, (2) carrier frequency error compensation, (3) carrier phase synchronization, (4) error correction and identification, by using the in-phase component I and the quadrature component Q outputted from the analog/digital converter 13. A restored (demodulated) received data signal is obtained through this signal processing. The processes of (1) to (4) are respectively performed by the waveform distortion compensation/polarization multiplexed signal separation processor 141, the carrier frequency error compensator 142, the carrier phase synchronizer 143, and the error correction/identification processor 144.

Figure 2:
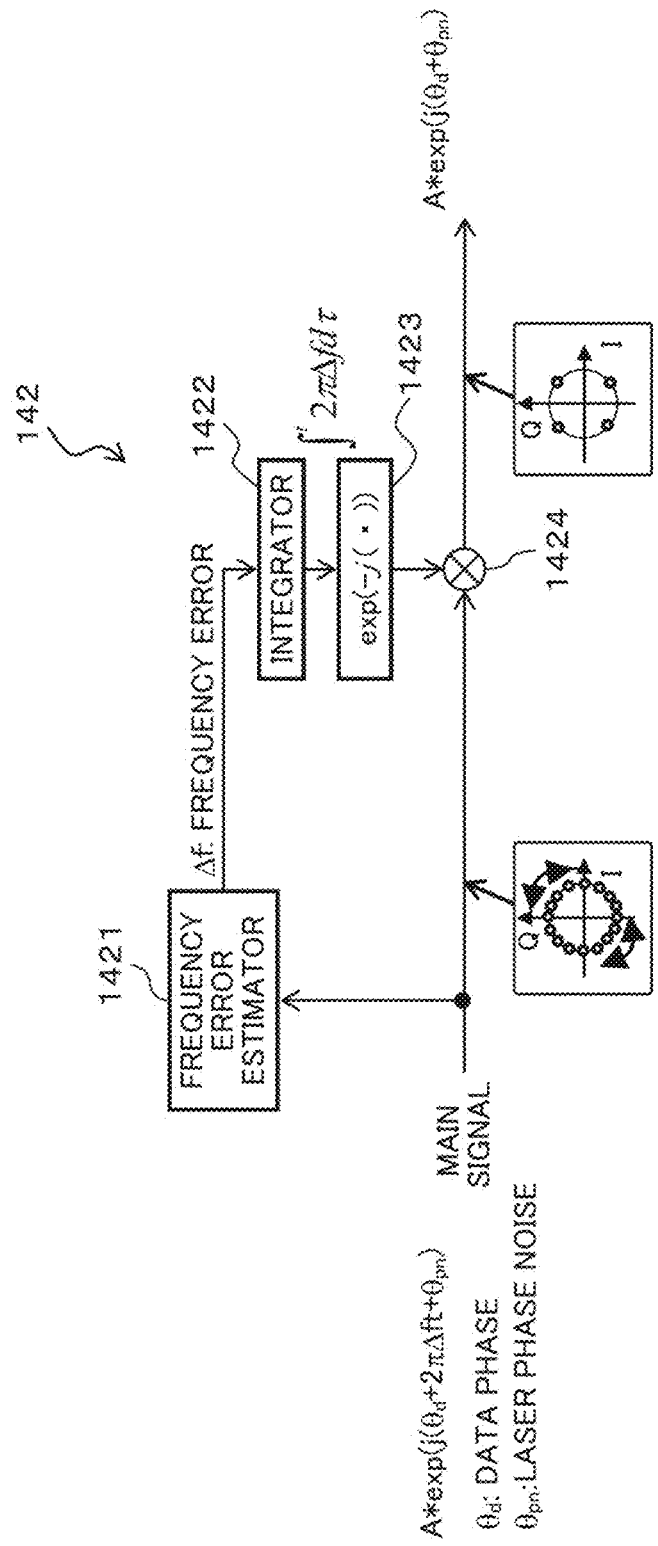
FIG. 2 is a block diagram illustrating an exemplary configuration of a carrier frequency error compensator illustrated in FIG. 1.

The carrier frequency error compensator 142 is an example of a frequency error compensating apparatus, and includes, for example, a frequency error estimator 1421, an integrator 1422, a reciprocal number calculator 1423, and a (complex) multiplier 1424, as illustrated in FIG. 2.

The frequency error estimator 1421 estimates a frequency error from a phase difference within a 1 symbol period according to the baseband digital electrical signal (hereinafter, may be referred to as the "baseband digital signal") which is a main signal. The main signal can be expressed by $A*\exp(j(\theta d+2\pi\Delta ft+\theta pn))$. Here, A represents a constant, $\theta d$ represents a modulated data phase, $\Delta f$ represents a frequency error, $\theta pn$ represents laser phase noise of the local oscillation light 11, j represents an imaginary unit, and t represents a symbol period.

The integrator 1422 integrates estimation values of the frequency error obtained by the frequency error estimator 1421 during a symbol period t.

The reciprocal number calculator 1423 calculates a reciprocal number (exp (−j(•))) of the frequency error, that is, θ=−2 πΔft by multiplying an output of the integrator 1422 by −1. Here, the "reciprocal number" is a number in which positive and negative signs are reversed. For example, with respect to "a," "−a" is a reciprocal number of "a."

The multiplier 1424 compensates the frequency error of the main signal by multiplying the main signal by the reciprocal number obtained by the reciprocal number calculator 1423. Thus, an output signal of the multiplier 1424 can be expressed by A*exp (j(θd+θpn)).

Figure 3:
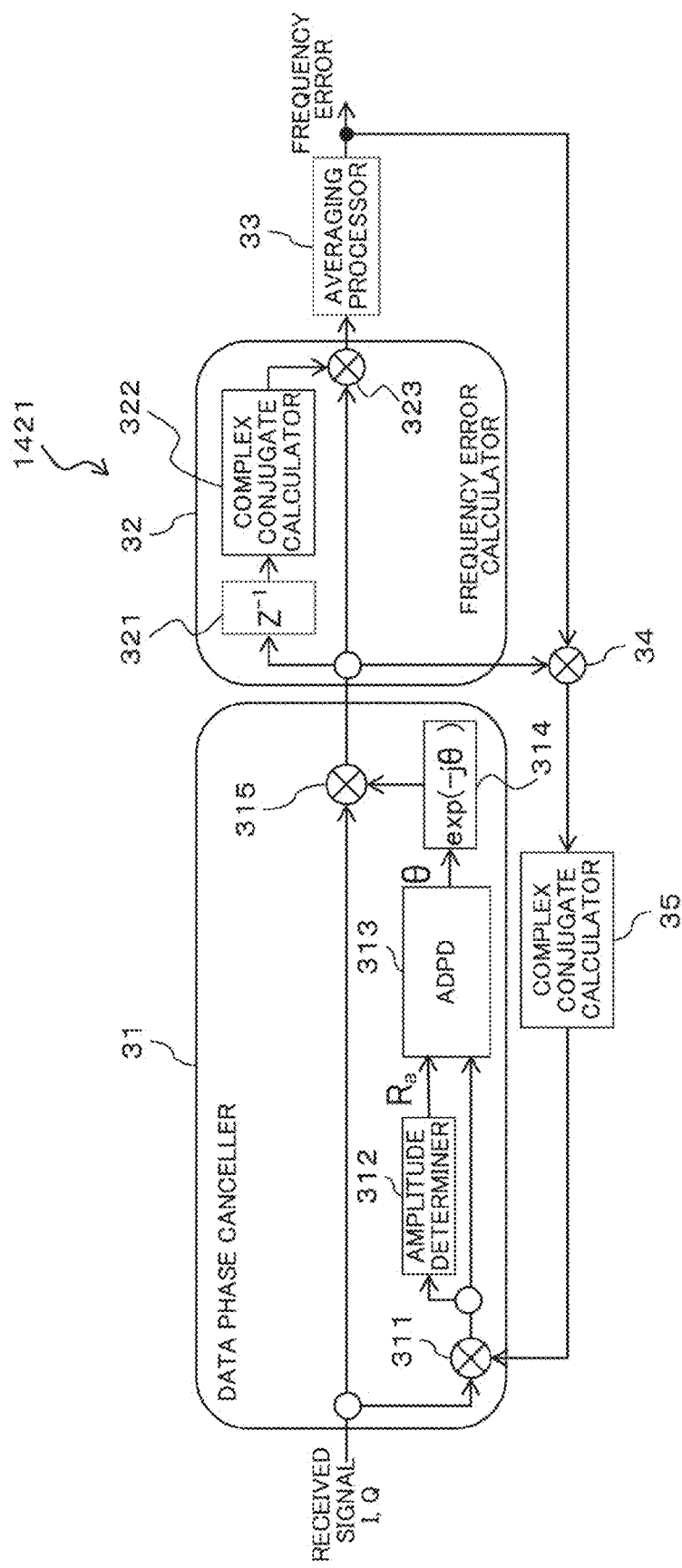
FIG. 3 is a block diagram illustrating an exemplary configuration of a frequency error estimator illustrated in FIG. 2.

Next, FIG. 3 illustrates an exemplary configuration of the frequency error estimator 1421. The frequency error estimator 1421 illustrated in FIG. 3 is an example of a frequency error estimating apparatus, and includes, for example, a data phase canceller 31, a frequency error calculator 32, an averaging processor 33, a (complex) multiplier 34, and a complex conjugate calculator 35. In FIG. 3, the data phase canceller 31 and the frequency error calculator 32 may be arranged in reverse order.

The data phase canceller 31 cancels a data phase from the inputted baseband digital signal. Therefore, the data phase canceller 31 includes, for example, a (complex) multiplier 311, an amplitude determiner 312, an amplitude directed phase determiner (ADPD) 313, a reciprocal number calculator 314, and a (complex) multiplier 315.

The frequency error calculator 32 calculates the frequency error from the baseband digital signal obtained by cancelling the modulated data phase with the data phase canceller 31. Therefore, the frequency error calculator 32 includes, for example, a delay circuit (register) 321, a complex conjugate calculator 322, and a (complex) multiplier 323.

In the data phase canceller 31, the multiplier 311 multiplies the inputted baseband digital signal by an output of the complex conjugate calculator 35. The complex conjugate calculator 35 calculates a complex conjugate of a resultant of multiplying an estimation value of a frequency error of N previous symbols (N is a positive integer) averaged by the averaging processor 33 by a baseband digital signal eliminated modulated data phase outputted from the multiplier 315. The baseband digital signal eliminated modulated data phase is obtained by cancelling a data phase from the inputted baseband digital signal and corresponds to a phase noise estimation value. Multiplying the complex conjugate by the baseband digital signal with the multiplier 311 gives a signal from which phase rotation caused due to a phase noise and frequency error is cancelled. The signal is inputted to the amplitude determiner 312 and the amplitude directed phase determiner 313.

Figure 4:
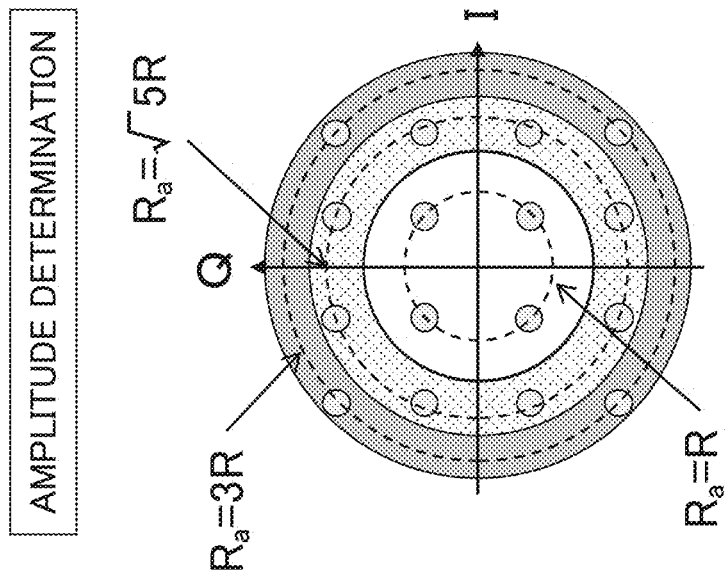
FIG. 4 is a constellation diagram for explaining an amplitude determination (16QAM) by the frequency error estimator illustrated in FIG. 3.

The amplitude determiner 312 determines (identifies) an amplitude Ra of the output of the multiplier 311. As a non-restrictive example, when the inputted baseband digital signal is a 16QAM signal, the amplitude determiner 312 determines whether the amplitude Ra is within any one of the following three ranges as illustrated on an IQ plane (constellation) of FIG. 4. Here, a radius of an equal amplitude circle passing through four signal points closest to an original point in the IQ plane is referred to as "R." The equal amplitude circle can be defined according to a multi-valued degree of the inputted baseband digital signal.

(1) $0 \leq Ra \leq R$
(2) $R < Ra \leq \sqrt{5}R$
(3) $\sqrt{5}R < Ra \leq 3R$

The amplitude directed phase determiner 313 performs identification in different angular directions for respective amplitudes based on a determination result obtained by the amplitude determiner 312, and provisionally determines a signal phase. For example, when the amplitude Ra is within the range (1) as illustrated in FIG. 5A, one of four types of signal phases θ is obtained as a provisional determination result according to a quadrant in which a signal point is positioned among four quadrants of the IQ plane as illustrated in FIG. 5B.

Figures 6A, 6B:
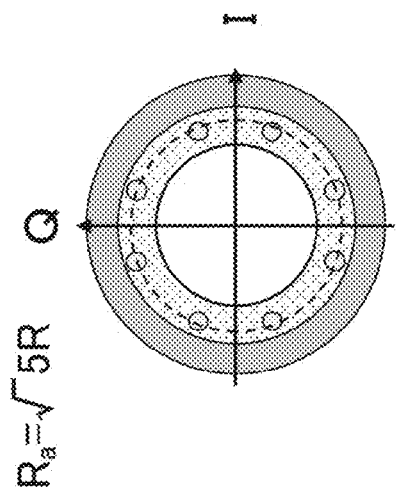
FIGS. 6A and 6B are diagrams for explaining an amplitude determination (16QAM) by the frequency error estimator illustrated in FIG. 3.
Figures 7A, 7B:
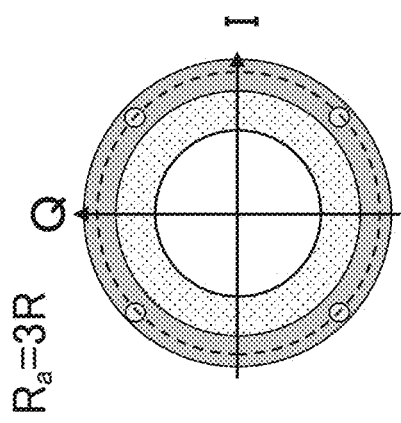
FIGS. 7A and 7B are diagrams for explaining an amplitude determination (16QAM) by the frequency error estimator illustrated in FIG. 3.

Similarly, when the amplitude Ra is within the range (2) as illustrated in FIG. 6A, one of 8 types of signal phases θ is obtained as a provisional determination result according to a region in which a signal point is positioned among regions obtained by dividing the IQ plane into 8 regions in a phase angle direction as illustrated in FIG. 6B. Further, when the amplitude Ra is within the range (3) as illustrated in FIG. 7A, one of four types of signal phases θ is obtained as a provisional determination result according to a quadrant in which a signal point is positioned among four quadrants of the IQ plane as illustrated in FIG. 7B.

As the provisional determination is performed, even when the inputted baseband digital signal includes phase rotation caused by a frequency error, a determination error rate can be reduced, and the frequency error estimation accuracy can be improved. Thus, the estimation value of the frequency error can be stabilized, thereby preventing the estimation value from converging with an erroneous estimation value and improving the tracking performance to variation in a frequency offset.

Figure 8:
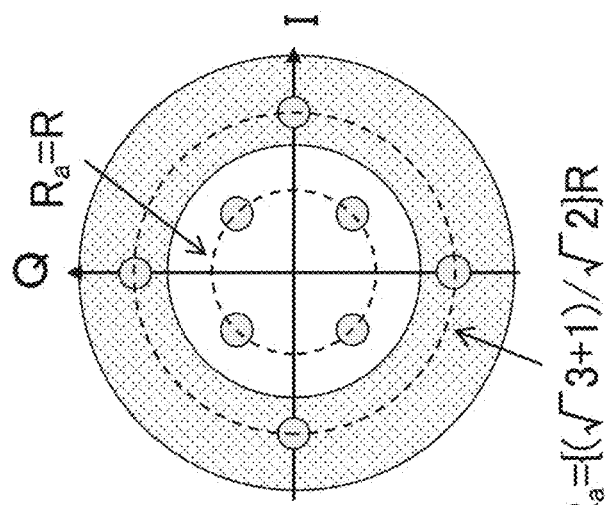
FIG. 8 is a constellation diagram for explaining an amplitude determination (8QAM) by the frequency error estimator illustrated in FIG. 3.

Further, when the inputted baseband digital signal is an 8QAM signal, the amplitude determiner 312 may determine whether the amplitude Ra is within any one of the following two ranges as illustrated on an IQ plane (constellation) of FIG. 8. A radius of an equal amplitude circle passing through four signal points closest to an original point in the IQ plane is referred to as "R."

(4) $0 \leq Ra \leq R$
(5) $R < Ra \leq \{(\sqrt{3}+1)/\sqrt{2}\}R$

Figures 9A, 9B:
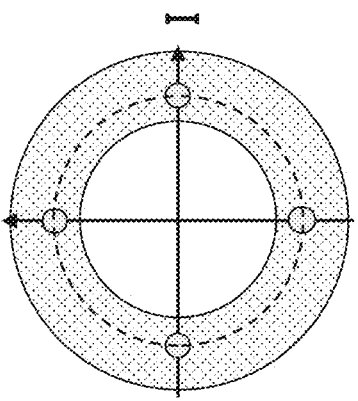
FIGS. 9A and 9B are diagrams for explaining an amplitude determination (8QAM) by the frequency error estimator illustrated in FIG. 3.

For example, when the amplitude Ra is within the range (5) as illustrated in FIG. 9A, one of 4 types of signal phases θ is obtained as a provisional determination result according to a region in which a signal point is positioned among regions obtained by dividing the IQ plane into 4 regions in a phase angle direction as illustrated in FIG. 9B.

Figures 10A, 10B:
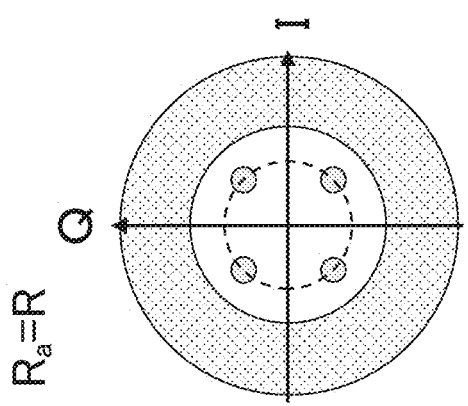
FIGS. 10A and 10B are diagrams for explaining an amplitude determination (8QAM) by the frequency error estimator illustrated in FIG. 3.

Similarly, when the amplitude Ra is within the range (4) as illustrated in FIG. 10A, one of 4 types of signal phases θ is obtained as a provisional determination result according to a quadrant in which a signal point is positioned among four quadrants of the IQ plane as illustrated in FIG. 10B.

Referring back to FIG. 3, the reciprocal number calculator 314 calculates a reciprocal number which is a provisional determination result of the signal phase θ obtained by the amplitude directed phase determiner 313 as described above, and inputs the calculated reciprocal number to the multiplier 315.

The multiplier 315 multiplies the inputted baseband digital signal by the output of the reciprocal number calculator 314 to cancel the signal (data) phase, and inputs the resultant signal to the frequency error calculator 32.

In the frequency error calculator 32, a complex conjugate of a signal obtained by delaying the output signal of the data phase canceller 31 by a 1 symbol time with the delay circuit 321 is calculated by the complex conjugate calculator 322, and the obtained complex conjugate is multiplied by the output signal of the data phase canceller 31 with the multiplier 323. As a result, a frequency deviation within a symbol time, that is, the estimation value of the frequency error is obtained.

The obtained estimation value of the frequency error is inputted to the averaging processor 33. The averaging processor 33 averages frequency error estimation values of a plurality of consecutive symbols to cancel a noise component.

(Modified Example of Frequency Error Estimator)

Figure 11:
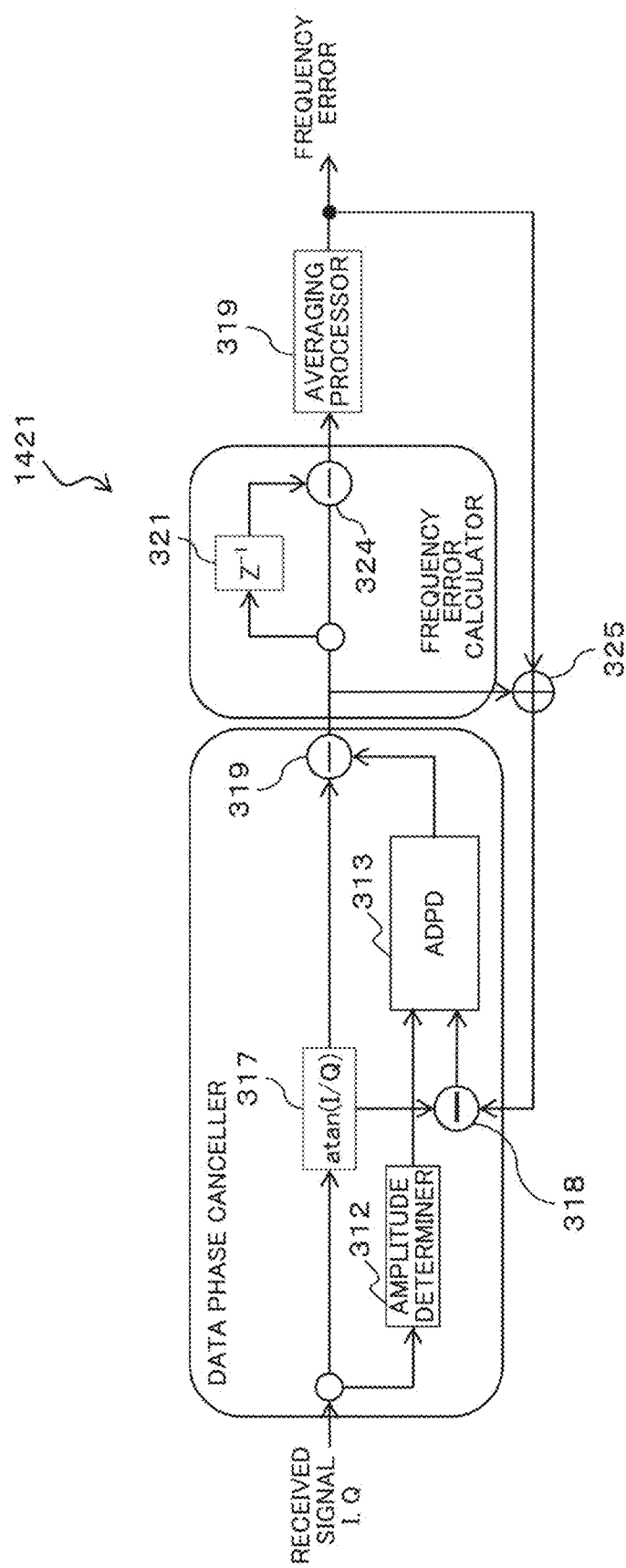
FIG. 11 is a block diagram illustrating a modified example of the frequency error estimator illustrated in FIG. 3.

Next, FIG. 11 illustrates a modified example of the frequency error estimator 1421 illustrated in FIG. 3. The frequency error estimator 1421 illustrated in FIG. 11 calculates a frequency error based on an argument of a signal phase, thereby implementing a configuration equivalent to the configuration illustrated in FIG. 3 without using a complex multiplication and a complex conjugate calculation.

In other words, the frequency error estimator 1421 illustrated in FIG. 11 includes an argument calculator 317 that calculates an argument (a tan (I/Q)) of an inputted baseband digital signal in the data phase canceller 31, for example. Thus, the functions of the complex conjugate calculator 35 and the multiplier 311 can be implemented by a substractor 318, and the functions of the reciprocal number calculator 314 and the multiplier 315 can be implemented by a substractor 319.

Similarly, in the frequency error calculator 32, the functions of the complex conjugate calculator 322 and the multiplier 323 can be implemented by a substractor 324, and the function of the multiplier 34 is implemented by an adder 325.

With such configuration, in the frequency error estimator 1421 illustrated in FIG. 11, the function equivalent to the function of the frequency error estimator 1421 illustrated in FIG. 3 can be implemented without using a complement multiplication and a complex conjugate calculation which are high in an operation load. Thus, a circuit can be simplified compared with the configuration illustrated in FIG. 3.

(Parallelized Circuit Configuration)

A signal speed dealt with by an optical communication system is much faster than a processing speed of the signal processor 14, and thus when circuits are implemented, parallelization is important. The circuit configurations illustrated in FIGS. 3 and 11 are of feed forward types, and are easily implemented in parallel.

Figure 12:
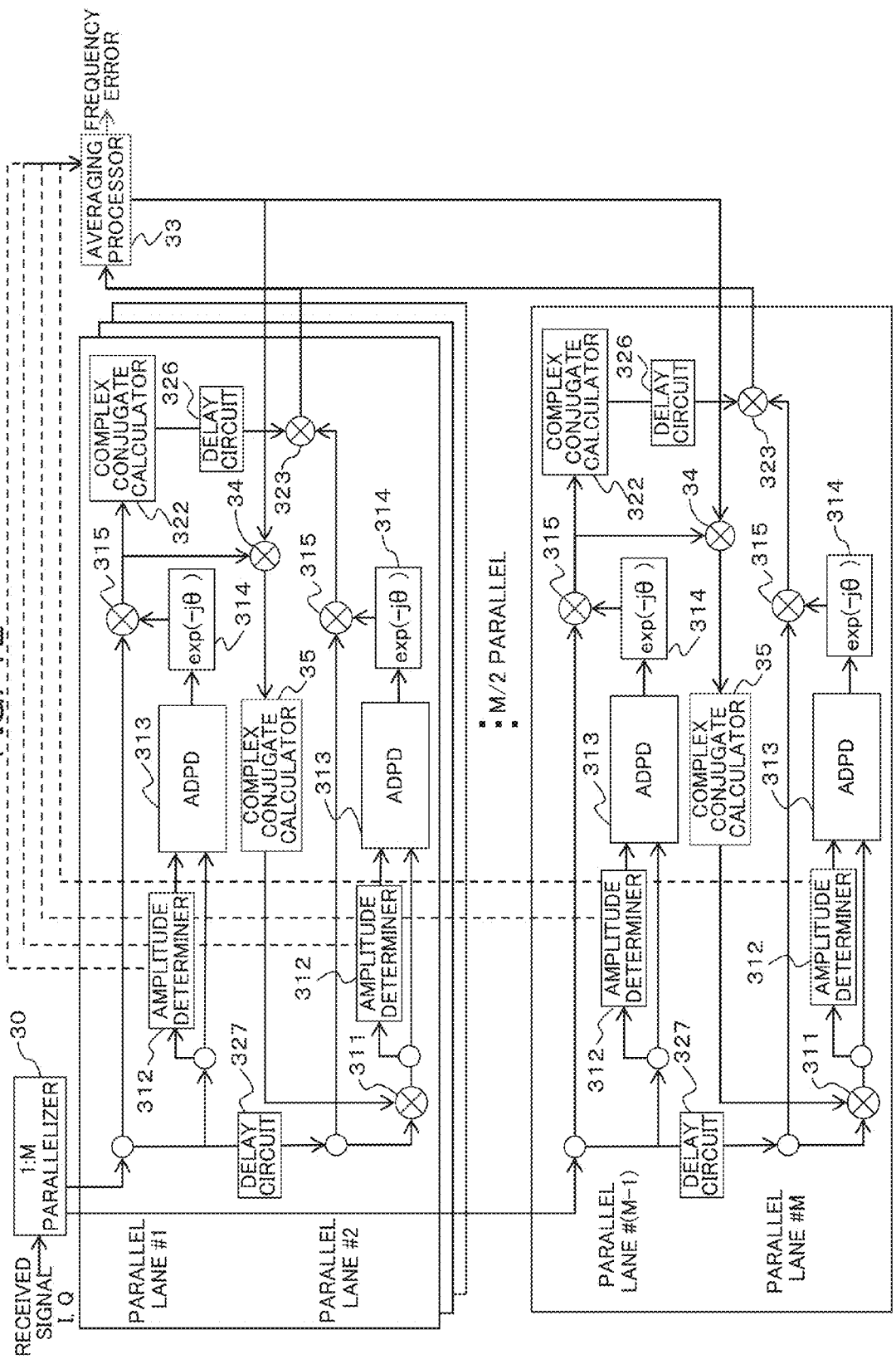
FIG. 12 is a block diagram illustrating an exemplary configuration corresponding to a circuit configuration derived by parallelizing the circuit configuration illustrated in FIG. 3 from one to M (1:M) (M is an integer of 2 or more)
Figure 13:
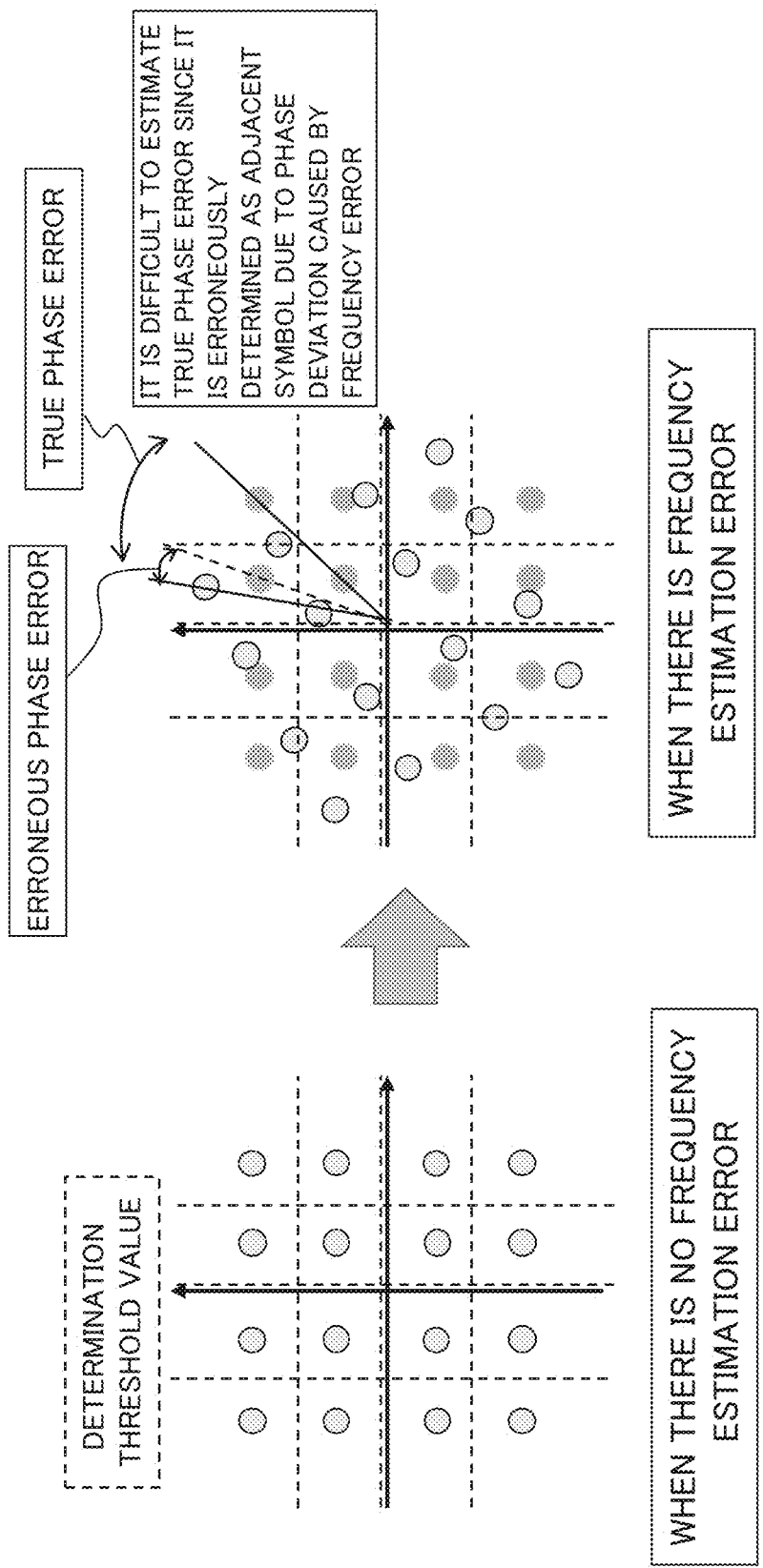
FIG. 13 is a constellation diagram for explaining a problem of the related art.

FIG. 12 illustrates an exemplary configuration corresponding to a circuit configuration derived by parallelizing the circuit configuration illustrated in FIG. 3 from one to M (1:M) (M is an integer of 2 or more). Note that the circuit configuration illustrated in FIG. 11 may be similarly parallelized.

As illustrated in FIG. 12, the received signal (baseband digital signal) is parallelized from one to M by a one to M parallelizer 30, and the parallelized signals are inputted to parallel lanes (branches) #1 to #M, respectively.

Among the parallel lanes #1 to #M, two parallel lanes serve as a lane pair. The lane pair may be a pair of an odd-numbered lane and an even-numbered lane as illustrated in FIG. 12 or a pair of odd-numbered lanes.

Each of the parallel lanes #1 to #M has a configuration similar to the configuration illustrated in FIG. 3. In other words, each of the parallel lanes #i (i=1 to M) includes the amplitude determiner 312, the amplitude directed phase determiner 313, and the reciprocal number calculator 314. However, one lane (an odd-numbered lane in the example of FIG. 12) of the lane pair does not need the multiplier 311 immediately before an amplitude determination, that is, does not need phase rotation by a phase noise and a frequency error. In the other lane (an even-numbered lane in the example of FIG. 12), a value obtained by multiplying a phase noise amount calculated in the one lane (an odd-numbered lane in the example of FIG. 11) by a frequency error amount of N previous symbols (N is a positive integer) is subjected to complex conjugate processing by the complex conjugate calculator 35 and is inputted to the multiplier 311 immediately before an amplitude determination.

Further, the baseband digital electrical signal inputted to one (an even-numbered lane in the example of FIG. 12) of parallel lanes constituting a lane pair is delayed by a 1 symbol time by a delay circuit 327 and then inputted to the multiplier 311. Thus, one lane pair performs an amplitude determination, a phase determination according to each amplitude, and a reciprocal number calculation for different symbol times.

The reciprocal numbers obtained in each of parallel lanes constituting a lane pair is multiplied by the baseband digital signal with the multiplier 315. As a result, a modulated phase component is cancelled from a baseband digital signal of a different symbol time.

A complex conjugate of one (a signal obtained in an odd-numbered lane in the example of FIG. 12) of signals from which a data phase component has been cancelled is calculated by the complex conjugate calculator 322, and then the signal is delayed by a predetermined time by a delay circuit 326 that compensates an operation delay in one parallel lane. The delayed signal is multiplied by a signal (an output signal of the multiplier 315) obtained by the other parallel lane (an even-numbered lane in the example of FIG. 12) by the multiplier 323. As a result, one frequency error estimation value is obtained per one lane pair.

The frequency error estimation values obtained by the respective lane pair are averaged by the averaging processor 33, thereby cancelling a noise component. The averaged frequency error estimation value is inputted to the multiplier 311 constituting the other parallel lane through the multiplier 34 and the complex conjugate calculator 35, and used for an amplitude determination, a phase determination according to each amplitude, and a reciprocal number calculation in one (an even-numbered lane in the example of FIG. 12) of the parallel lanes.

With the above parallelized process, the frequency error estimation processes for different symbol times can be executed in parallel in a one lane pair. Thus, compared to a sequential process, influence of an estimation error caused by a temporal variation can be reduced, and the frequency error estimation accuracy can be improved.

(Modified Example of Parallelized Circuit Configuration)

Control may be performed such that signals used in an averaging process performed by the averaging processor 33 are limited based on an amplitude determination result obtained by the amplitude determiner 312 (see dotted line arrows in FIG. 12).

For example, when $R < R_a \leq \sqrt{5}R$ in the 16QAM (see FIG. 7A), a range of a determined phase is narrower than other cases (see FIG. 6A and FIG. 8B), and thus a phase determination error is easy to occur.

In this regard, for example, when an amplitude determination result of one (for example, an odd-numbered lane) of parallel lanes constituting a lane pair is within the range of $R < R_a \leq \sqrt{5}R$, the frequency error estimation value of the corresponding parallel lane is not used for the averaging process. In other words, only when the amplitude determination result is not within the range of $R < R_a \leq \sqrt{5}R$, the frequency error estimation value is used for the averaging process.

Further, when amplitude determination results of two parallel lanes constituting a lane pair are within the range of R<Ra≤√5R, the frequency error estimation values of the two parallel lanes may be prevented from being used for the averaging process.

As the frequency error estimation value obtained when the amplitude determination result is within the range of R<Ra≤√5R in which a phase determination error is easy to occur is excluded from the averaging process as described above, the frequency error estimation accuracy can be improved.

The device according to the above embodiment may be implemented by computer software that causes a computer to execute the above-described function of the device or causes a computer to execute the steps of the above-described method. For example, a general-purpose computer or a dedicated computer which includes a CPU, a ROM, an input/output device, a hard disk, a RAM, and the like may be used as the computer. A computer program may be a single computer program or a set of programs including a plurality of computer programs.

A computer program or a set of programs may be stored in a computer readable storage medium. Examples of the computer readable storage medium include a hard disk device, a ROM, a RAM, a CD, a DVD, a floppy (a registered trademark) disk, a flash memory, a magnetic disk, and any medium known to a person skilled in the art.

According to the above-described technology, it is possible to improve the frequency error estimation accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A frequency error estimating apparatus used for a coherent optical receiver, comprising:
   a data phase canceller including:
      an amplitude determiner configured to receive a baseband digital electrical signal converted from a received light signal modulated with a phase and amplitude shift keying and determine an amplitude for each of a plurality of groups of symbols in the baseband digital electrical signal, the plurality of groups of symbols being based on a radius; and
      an amplitude directed phase determiner configured to determine a modulated phase component of the determined amplitude of at least one of the plurality of groups, the data phase canceller being configured to cancel the modulated phase component from the baseband digital electrical signal to obtain a resultant signal; and
   a frequency error calculator configured to calculate a frequency error based on the resultant signal.

2. A frequency error compensating apparatus, comprising:
   the frequency error estimating apparatus according to claim 1; and
   a frequency error compensator configured to generate a signal used to compensate a frequency error obtained by the frequency error estimating apparatus.

3. An optical receiver, comprising:
   a front-end processor configured to convert a received light signal modulated with a phase and amplitude shift keying into a baseband digital electrical signal; and
   the frequency error compensating apparatus according to claim 2 configured to perform frequency error compensation on the baseband digital electrical signal obtained by the front-end processor.

4. The frequency error estimating apparatus according to claim 1, further comprising:
   a parallelization processor configured to parallelize the baseband digital electrical signal into M signals (M is an integer of 2 or more); and
   M parallel branches to which the M signals parallelized from the baseband digital electrical signal are inputted, respectively,
   wherein each of the parallel branches comprises the amplitude determiner, the amplitude directed phase determiner, and the frequency error calculator,
   the parallel branches are configured such that two parallel branches form a branch pair, and
   the inter-symbol phase difference is obtained for the baseband digital electrical signals of different symbol times between the parallel branches forming a branch pair.

5. A frequency error compensating apparatus, comprising:
   the frequency error estimating apparatus according to claim 4; and
   a frequency error compensator that generates a signal used to compensate the frequency error obtained by the frequency error estimating apparatus.

6. An optical receiver, comprising:
   a front-end processor configured to convert a received light signal modulated with a phase and amplitude shift keying into a baseband digital electrical signal; and
   the frequency error compensating apparatus according to claim 5 configured to perform frequency error compensation on the baseband digital electrical signal obtained by the front-end processor.

7. A frequency error estimating method in a coherent optical receiver, comprising:
   receiving a baseband digital electrical signal converted from a received light signal modulated with a phase and amplitude shift keying;
   determining an amplitude for each of a plurality of groups of symbols in the baseband digital electrical signal, the plurality of groups of symbols being based on a radius;
   determining a modulated phase component of the determined amplitude of at least one of the plurality of groups;
   cancelling the modulated phase component from the baseband digital electrical signal to obtain a resultant signal; and
   calculating a frequency error based on the resultant signal.

* * * * *